United States Patent [19]

Perletti et al.

[11] Patent Number: 5,112,627
[45] Date of Patent: May 12, 1992

[54] STABILIZATION PROCESS PARTICULARLY FOR GRAPE MUST

[75] Inventors: Fabio Perletti, Piazzale dello Sport 4, 20151 Milan; Erminio Collareda; Bruno Collareda, both of Schio, all of Italy

[73] Assignees: O.M.C. Officina Meccanica Collareda S.r.l, Schio; Fabio Perletti, Milan, both of Italy

[21] Appl. No.: 640,749

[22] Filed: Jan. 14, 1991

[30] Foreign Application Priority Data

Jan. 19, 1990 [IT] Italy .................. 19101A/90

[51] Int. Cl.$^5$ .................... C12G 1/00; A23B 7/144
[52] U.S. Cl. ........................ 426/50; 426/49; 426/51; 426/236; 426/312; 426/330.4
[58] Field of Search ............. 426/49, 50, 51, 236, 426/312, 330.4

[56] References Cited

U.S. PATENT DOCUMENTS 2,108,030 2/1938 Darrah ........................ 426/236
4,211,799 7/1980 Grampp et al. ............... 426/51

FOREIGN PATENT DOCUMENTS 5734073 1/1975 Australia.

OTHER PUBLICATIONS

Chemical Abstracts, vol. 95, No. 9, Oct. 1981, Columbus, Ohio, U.S.; Abstract No. 148659, Guerzoni, M. E. et al., "Stabilization of White Wine by Early Hyperoxidation of Must", p. 496, column 2, abstract.
Chemical Abstract, vol. 96, No. 5, Mar. 1982, Colubmus, Ohio, U.S.; Abstract No. 67208, Uses: Nauchno–Issled, "Treatment of Must and Wine for Grapes Infected with Grey Mold", p. 465; column 1, abstract.
Chemical Abstracts, vol. 78, No. 13, Apr. 2, 1973, Columbus, Ohio, U.S.; Abstract No. 82907, Valaiko, G. G. "Preparation of Red Semisweet Wines in Armenia", p. 319, column 1, abstract.

Primary Examiner—Donald E. Czaja
Assistant Examiner—Helen Pratt
Attorney, Agent, or Firm—Guido Modiano; Albert Josif

[57] ABSTRACT

The room-temperature stabilization process particularly for grape must, includes the steps of conveying a flow of grape must to be stabilized, which has preliminarily been subjected to a depectizing treatment with enzymes, toward a flotation tank, of pressurizing all or part of the must in a pressurization tank with dissolution of an oxidizing gas at a pressure comprised between 2 and 6 bar, of depressurizing the part through a laminar flow valve, of mixing the flow of crude must and the depressurized must, of adding coagulating substances in the flow, of feeding the flow into a tank with a very low head in which the supersaturated gas is released in the form of microscopic bubbles which cling to the particles suspended in the must, making them float toward the surface, of removing the floated solids from the surface of the tank and the settled solids from the bottom, and finally of extracting the stabilized must from the tank after a permanence time of no more than 20 minutes.

14 Claims, 1 Drawing Sheet

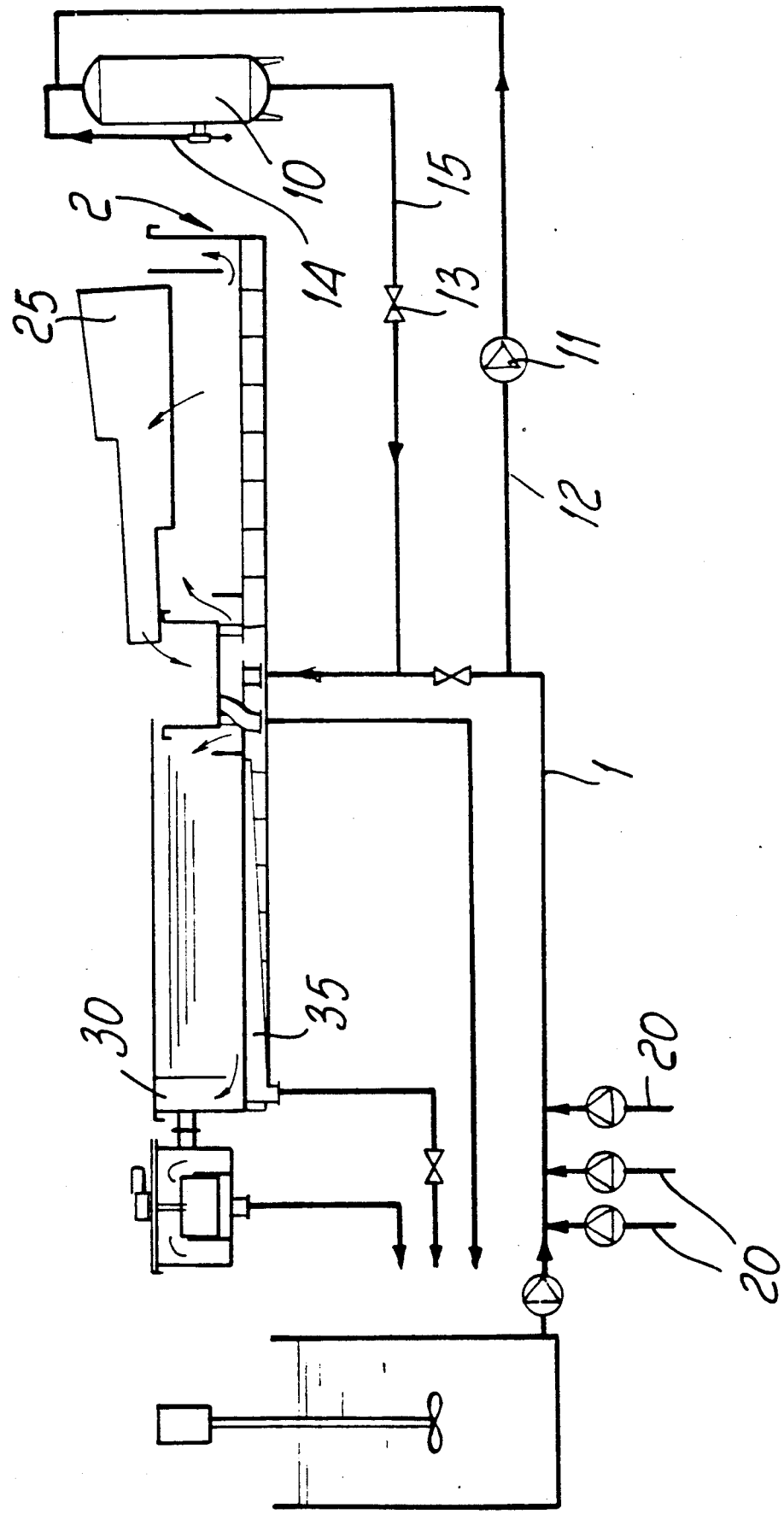

STABILIZATION PROCESS PARTICULARLY FOR GRAPE MUST

BACKGROUND OF THE INVENTION

The present invention relates to a room-temperature stabilization process particularly for grape must.

As is known, the substances which contaminate must are generally removed by decanting the must in appropriate vats, in which some turbid substances are separated, partly by decanting, partly by floating, or with dynamic systems, such as centrifugation, or with filtration systems.

These processes have a series of disadvantages, since in the case of decanting in vats the process requires a long time and the use of a large number of vats, so that since the treatment cannot be performed simultaneously on all the must produced it is necessary to stabilize the must by using, as conventional methods, sulfurization with sulfites and/or low-temperature refrigeration.

The methods which reduce the time necessary for the cleaning of the must by using centrifugation cells generally have a rather low productive capacity an a high cost.

Filtration methods instead have severe problems which arise most of all from the large amount of substances to be removed, which tend to clog the filters very quickly, and in any case these methods require a relatively long time.

In all the conventional methods adopted so far it is furthermore necessary to use clarification agents in massive doses, and for the final stabilization of the must it is necessary to add sulfites also in heavy doses, with negative effects on the quality of the must itself.

The European patent EP 0 090 734 describes a process for the clarification of fruit juices and possibly also of musts which is specifically used so as to not eliminate the pectines which are present in the liquids and so as to not oxidize the substances which are present; said process provides a system for flotation by means of an insert gas in order to separate the suspended parts. This type of process is not suitable for stabilizing grape musts, since first of all it is necessary to eliminate the pectins, which physically behave as protective colloids and which, once removed, create instability and therefore allow the precipitation and the immediate removal of other colloids, including tartaric salts, which would otherwise develop slowly during the subsequent stages of the maturation of the must, making it turbid; secondly, it is necessary to oxidize the polyphenolic substances early so as to cause their polymerization with consequent combination with the protein substances which are present in the must, so as to produce coagulations which can be easily removed by flotation.

SUMMARY OF THE INVENTION

The aim of the invention is indeed to solve the above described problems by providing a new process for stabilizing must which allows to perform the treatment continuously and in extremely short times.

Within the scope of the above described aim, a particular object of the invention is to provide a process for the stabilization of must which does not use, or significantly limits the use of, deoxidizing chemical agents such as sulfites and allows the use of clarification agents, such as bentonite, silic sol, gelatine and the like, in very small amounts with respect to conventional methods.

Another object of the present invention is to provide a process for stabilizing must which allows to achieve a considerable saving is engaged energy and in sophisticated and expensive facilities, which are typical of conventional centrifugation and refrigeration methods.

A further object of the present invention is to provide a process which allows to significantly reduce the number of treatment vats, since the vat decanting time which characterizes conventional methods is eliminated.

Not least object of the present invention is to provide a process which allows to improve production programmability, obtaining improved product quality and uniformity with respect to conventional methods.

This aim, the objects mentioned and others which will become apparent hereinafter are achieved by a stabilization process, particularly for grape must, as defined in the appended claims.

BRIEF DESCRIPTION OF THE DRAWINGS

Further characteristics and advantages will become apparent from the description of a preferred but not exclusive embodiment of a stabilization process particularly for grape must, illustrated only by way of non-limitative example in the accompanying drawing, in which a diagram of an apparatus which can be used to perform the process is represented.

DESCRIPTION OF THE PREFERRED EMBODIMENTS

The process according to the invention has the purpose of stabilizing the must obtained from grapes after crushing or pressing and stalk removal or draining, by performing a continuous treatment which allows to obtain high clarification, and which separates from the must, in a single operation, the unwanted substances, i.e. the dregs, constituted by soil, vegetable substances, molds and the like, as well as the protein substances, the oxidized polyphenols, the tartaric salts and the colloids in general which are responsible of the clouding of the must first and of the wine later, obtaining at the same time a significant reduction in the microbial load (bacteria, yeasts and the like), which are agents responsible for the fermentation and oxidation of the must.

The process substantially consists in depectizing or peptizing the must contained in the storage tank, by means of the addition of appropriate enzymes in appropriate dosages, at least one or two hours prior to the clarification treatment.

The must to be clarified, having been stored in a storage tank, is subsequently conveyed by means of an inlet duct, indicated by 1, toward a flotation tank, generally indicated by the reference number 2, which has the characteristic of having a relatively low level, generally lower than 1 meter.

The flotation process which can be used is dissolved-gas flotation (using air or oxygen) or, as an alternative, the flotation method know as electroflotation, in which the bubbles of gas, including oxygen, are produced by electrolysis of the liquid caused by an electric current which is made to circulate between two electrodes immersed in the liquid.

In particular, in using the dissolved-air flotation method it was necessary to make sure that air was suitable for the specific use, and it was observed that air, or rather the oxygen contained therein, causes the early oxidation and polymerization of the oxidizable polyphenols present n the must; these polymerized polyphenolic substances, which have a negative charge, combine with the proteins present in the must (which have a positive charge), forming aggregates (tannin-protein compounds) which can be easily removed by flotation.

Optimum results were obtained by dissolving the air fed through a duct 14 into a pressurize tank, indicated by 10, in which all or part of the must to be stabilized is conveyed; said must arrives from the duct 1, which is connected to the storage tank where depectizing occurs.

The must which is pressurized and fed into the tank 10 by means of a pump 11 which acts on the delivery duct 12 can constitute 20 to 100% of the flow to be processed.

The pressurized must which flows out of the tank 10 is fed, after depressurization through a laminar flow valve 13, through a return duct 15, into the inflow duct 1 which leads into the flotation tank, thus obtaining a mix of crude must saturated with gas and crude must "as is", in which the percentages can be varied extensively.

The pressure values for obtaining the dissolution of the gas in the must inside the tank 10 are advantageously comprised between 2 and 6 bar.

The choice of the optimum pressure and flow values and saturation with air or oxygen depend on the quality of the must, on its temperature and on the concentration of suspended solids contained therein, as well as on the concentration of the polyphenolic substances to be oxidized.

The flow-rate i.e. the consumption of the gas to be dissolved also consequently varies and is proportional to the flow-rate of the must to be pressurized as well as to the pressurization pressure and temperature.

In most cases, pressurization at 3-4 bar on the total flow of crude must is optimum.

Ducts for additives, indicated by 20, for the in-line feeding of coagulation agents, are connected to the duct 1 preferably ahead of the region where the pressurized must is fed; said agents are advantageously constituted by bentonite and silica sol to remove the positively charged colloids, by gelatine, potassium caseinate, albumin, positively charged colloidal silica and the like, to remove the negatively charged colloids.

Doses vary according to the quality of the must to be treated and to the substances used in combination; merely by way of indication, and with reference to the most commonly used substances, i.e. bentonite, silica sol and gelatine, the related doses are comprised within the range of 5-20 g/hl, 20-50 g/hl and 5-10 g/hl respectively.

In the execution of the process, the pressure of the pressurized must is in practice released through a laminar flow valve immediately ahead of the entry of the must into the flotation tank, so that the supersaturated gas is released in the form of microscopic bubbles which cling to the suspended particles and form an aggregate with a very low relative density which rises through the liquid medium in which it is immersed at a much faster rate than the normal particle sedimentation rate.

In this manner, most of the particles present in the must are caused to float to the surface of the flotation tank, which has a low liquid head and in which there is a system 25 with a rotating scoop for the removal of the solids floated to the surface which acts gently so as to avoid causing any sinking of a fraction of the floated particles back into the underlying liquid.

Means are further more provided on the bottom of the flotation tank and remove any settled solids by means of a scraper which is radially movable on the bottom which conveys the settled solids into an appropriate collection tank 35.

The stabilized must is drawn from an extraction duct, indicated by 30, which in practice draws from the tank 2 at a level which is lower than the free surface, after a period of permanence in the tank which does not exceed 20 minutes.

The gas dissolution tank has no porous partitions for the diffusion of the gas in the liquid, so as to facilitate its dissolution. Said partitions would constitute a receptacle for dirt and bacteria which would not make it suitable for use in the treatment of musts and the like.

Polyphenolic substances, nitrogenous colloidal substances and colloids in general, as well as most of the microbial load, are removed from the clarified must thus obtained, which undergoes the treatment for a period of time comprised between 10 and 20 minutes, so that said must is in practice stabilized.

In a must without the above mentioned substances, which have been removed, oxidation and spontaneous fermentation are significantly inhibited, and said must can therefore be transported and stored while waiting for the subsequent vinification, which at this point can be deferred, guided and performed according to the requirements vinification will occur with the subsequent reintroduction of substances which are appropriately selected in an optimum manner, so as to control the subsequent vinification process as required.

From what has been described above it can thus be seen that the invention achieves the proposed aim and objects, and in particular it can be seen that it provides the possibility, by operating continuously, of drastically reducing treatment times, providing a large series of induced advantage which range from savings in adjuvant products to energy saving and to the reduction of facilities.

It is possible to avoid the need for prior refrigeration of the must and/or for subjecting it to sulphite treatment to prevent its fermentation prior to the subsequent treatment step.

Another important aspect is furthermore constituted by the fact that at the end of the treatment the must is suitable for a possible finishing treatment for the substantially complete sterilization of the must, using the method of tangential filtration with a hollow-fiber membrane. This recently introduced technology is in fact effectively and conveniently applicable at the industrial level only to grape musts or juices in general in which the turbidity value is in the range of 20-30 NTU.

Tests conducted have shown the product, after the treatment described in the invention, followed by a tangential filtration treatment, to be perfectly clear (turbidity of less than 0.6 NTU) and practically sterile.

This last peculiarity is particularly important for the new perspectives which are offered to the evolution of oenology: vinification in the absence of sulphur dioxide, perfectly guided and controlled fermentations, production of grape juices and other beverages from fruit and vegetable products.

The invention thus conceived is susceptible to numerous modifications and variations, all of which are within the scope of the inventive concept; thus, for example, the process according to the invention is equally applicable, with equal advantages, for stabilizing not only grape must but in general all must which derive from the processing of fruit or other juice-producing vegetables.

All the details may furthermore be replaced with other technically equivalent elements.

In practice, the materials employed, as well as the dimensions and the contingent shapes, may be any according to the requirements.

We claim:

1. Stabilization process for must comprising the steps of preliminarily subjecting crude must to a depectizing treatment by enzyme addition and subsequently subjecting the must to an oxidation an flotation treatment, said oxidation treatment comprising the dissolving of an oxygen-containing gaseous substance in the must, said oxygen causing the oxidation and polymerization of polyphenolic substances for the coagulation of protein substances present in the must, said flotation treatment comprising causing said gaseous substance to achieve supersaturated conditions and thereby be released in the form of microscopic bubbles, said microscopic bubbles clinging to particles suspended in the must thereby causing said particles to float, said flotation being carried out in a flotation tank, said flotation treatment further comprising removing said floated particles from the surface of said tank, settled heavy solids being removed from the bottom thereof, said process thereby producing a stabilized must which is extracted from said tank.

2. Process according to claim 1, wherein said flotation treatment is an electroflotation treatment in which bubbles of gas, including oxygen, are produced by electrolysis of the must caused by an electric current made to circulate between two electrodes immersed in said must.

3. Process according to claim 1, wherein said flotation treatment comprises the steps of conveying a first part of a flow of must to be stabilized toward said flotation tank, of pressurizing a second part of a flow of must to be stabilized in a pressurization tank with dissolution of air and oxygen, of depressurizing said second part of a flow of must, of mixing said first part of a flow of must with said depressurized second part of a flow of must, of feeding said mixed flow into said tank in which the supersaturated gaseous substance is released in the form of microscopic bubbles which cling to the particles suspended in the must, making them float to the surface.

4. Process according to claim 1, wherein the stabilized must is extracted from the flotation tank after a permanence time of less than 20 minutes.

5. Process according to claim 3, wherein the dissolution of air and oxygen in said pressurization tank occurs at a pressure between 2 and 6 bar.

6. Process according to claim 1, wherein said enzymes are fed into the crude must at least 1-2 hours prior to its treatment by flotation, with dosages according to the temperature of the must and to the type of enzyme used.

7. Process according to claim 3, wherein said pressurized second part of a flow of must represents a fraction comprised between 20 and 100% of the flow of crude must to be processed.

8. Process according to claim 7, wherein said pressurized second part of a flow of must represents 100% of the flow of crude must to be processed and a pressure of 3-4 bar is exerted in said pressurization tank.

9. Process according to claim 1, wherein it uses, as said gaseous substance, one with oxidizing characteristics.

10. Process according to claim 1, wherein it further comprises the step of adding coagulation agents to said flow of must, said coagulation agents being constituted by bentonite and silica sol for removing positively charged colloids and gelatine, potassium caseinate, albumin or positively charged colloidal silica for removing the negatively charged colloids.

11. Process according to claim 10, wherein said bentonite is fed in an amount comprised between 5 and 20 g/hl.

12. Process according to claim 10, wherein said silica sol is fed in an amount comprised between 20 and 50 g/hl.

13. Process according to claim 10, wherein said gelatine is fed in an amount comprised between 5 and 10 g/hl.

14. Stabilization process for grape must comprising the steps of preliminarily subjecting crude must to a depectizing treatment by enzyme addition and subsequently subjecting the must to an oxidation and flotation treatment, said oxidation treatment comprising the dissolving of an oxygen-containing gaseous substance in the must, said oxygen causing the oxidation and polymerization of polyphenolic substances for the coagulation of protein substances present in the must, said flotation treatment comprising causing said gaseous substance to achieve supersaturated conditions and thereby be released in the form of microscopic bubbles, said microscopic bubbles clinging to particles suspended in the must thereby causing said particles to float, said flotation being carried out in a flotation tank, said flotation treatment further comprising removing said floated particles from the surface of said tank, settled heavy solids being removed from the bottom thereof, said process thereby producing a stabilized must which is extracted from said tank.

* * * * *